May 31, 1949.  J. N. GLADDEN  2,471,615
BUSHING
Filed Aug. 7, 1944
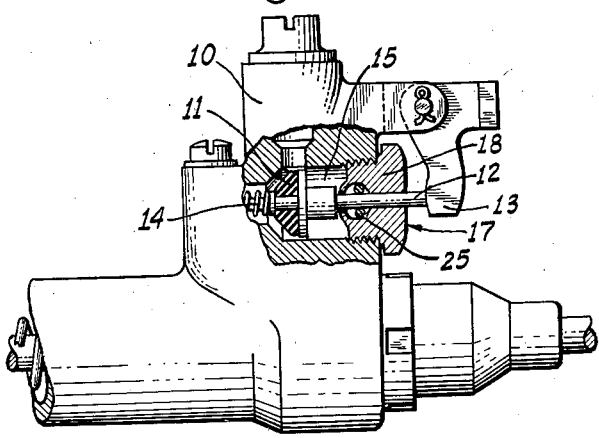
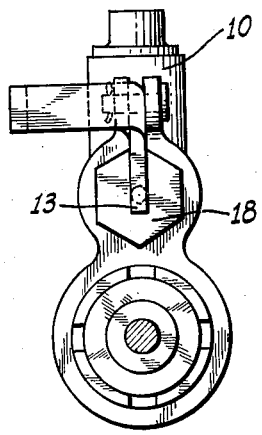
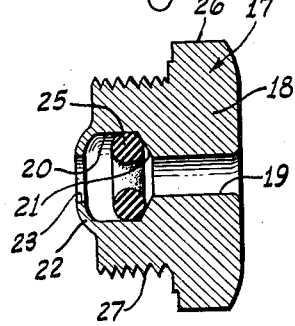
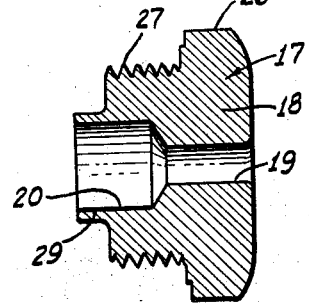
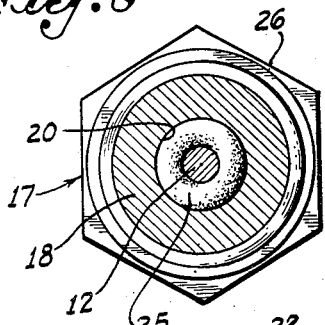
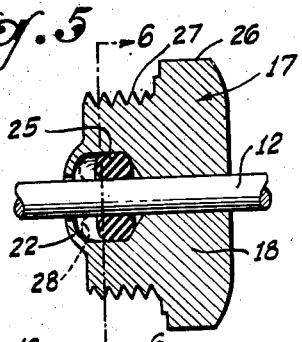
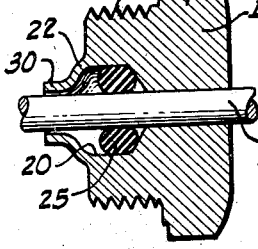
INVENTOR
JOHN N. GLADDEN
BY HARRIS, KIECH, FOSTER & HARRIS
FOR THE FIRM
ATTORNEYS Patented May 31, 1949

2,471,615

UNITED STATES PATENT OFFICE 2,471,615

BUSHING

John N. Gladden, Glendale, Calif.

Application August 7, 1944, Serial No. 548,439

3 Claims. (Cl. 286—26)

My invention relates to the bushing art and, more particularly, to a novel bushing and a method of manufacturing the same.

It is a primary object of this invention to provide a bushing adapted to form a fluid seal, resistant to high fluid pressures, around a tubular member, whether the tubular member is stationary or movable with respect to the bushing, and which is simple and economical to fabricate and install.

Other objects and advantages of the invention will be apparent from the following specification and the drawing, in which:

Fig. 1 is a longitudinal view, partly in section, of a valve device having my invention installed therein.

Fig. 2 is an end view of the device illustrated in Fig. 1.

Fig. 3 is a longitudinal sectional view illustrating one step in the manufacture of my device.

Fig. 4 is a view similar to Fig. 3 illustrating a further step in the manufacture of the invention.

Fig. 5 is a view similar to Fig. 3 illustrating the device as assembled.

Fig. 6 is a cross-sectional view taken on the line 6—6 of Fig. 5.

Fig. 7 is a fragmentary cross-sectional view of an alternative form of the invention.

Referring to the drawing, Figs. 1 and 2 illustrate a preferred embodiment of my invention in a commercial device. As shown, a valve device 10 contains a poppet valve 11 having a valve stem 12 engaged at its outer end by a bell crank lever 13 which, through actuation, is adapted to move the valve stem and the poppet valve inwardly to seat the poppet valve on its valve seat, a spring 14 being provided to normally hold the poppet valve in its open or unseated position. The poppet valve 11 operates in a chamber 15 normally containing fluid under high pressure, and consequently it is necessary to provide a fluid seal between the valve stem 12 and the wall of the housing of the valve device which will withstand the fluid pressure in the chamber 15, and at the same time permit reciprocation of the valve stem 12. This is accomplished by providing a bushing 17, which may also be referred to as an insert member or nut, through which the valve stem 12 of the poppet valve 11 extends.

The bushing 17 includes a body member 18 having a longitudinal bore 19 therein with an axially aligned and concentric counterbore 20 separated from the longitudinal bore 19 by an annular shoulder 21. The counterbore 20 terminates in a closure element 22 which closes the outer end of the counterbore and which is provided with an opening 23 which is substantially axially aligned with the bore 19 but of larger diameter, the closure element being formed integrally with the body member 18. It will be understood, however, that the opening 23 may be of the same diameter as the bore 19, if desired. Although the closure element 22 is preferably cup-shaped in form, as illustrated, it may be of any desired configuration. Carried in the counterbore 20, between the shoulder 21 and the closure element 22, is an annular sealing ring 25, which, as illustrated in Fig. 4, is normally substantially circular in cross section, and which is formed of resilient material, such as, for example, neoprene or rubber. As will be noted from Fig. 4, the inner diameter of the sealing ring 25, when assembled in the body member 18, is preferably somewhat less than the diameter of the longitudinal bore 19, so that when a tubular member of substantially the same external diameter as the bore 19 is passed therethrough, as illustrated by the valve stem 12 in Fig. 5, the sealing ring 25 will be somewhat compressed in its radial dimension, as illustrated, to provide a tight fluid seal between the valve stem 12 and the body member 18. If desired, before assembly, the sealing ring 25 may be of larger internal diameter than the bore 19, provided that its external diameter is sufficiently larger than the counterbore 20 to cause radial compression of the sealing ring in assembly to approximately the internal diameter as shown. The fluid seal formed by the sealing ring 25 is sufficiently effective to withstand fluid pressures of several thousand pounds per square inch without substantial leakage, and may therefore be used in high pressure hydraulic devices, such as the valve device 10 illustrated in Fig. 1. The body member 18, as will be noted, is provided with a hexagonal nut head 26 and is provided with an externally threaded portion 27 to adapt it to be readily installed in a threaded opening. It will be understood, however, that the threaded portion 27 and the nut head 26 may be omitted for certain installations without departing from the spirit of the invention.

It is also to be noted that the length of the counterbore 20 is substantially greater than the axial diameter of the sealing ring 25 when the same is compressed, as illustrated in Fig. 5, so that the sealing ring may roll or otherwise move to the position illustrated in dotted lines 28 in Fig. 5 when the valve stem 12 is reciprocated, and this is a further feature of the invention. Such movement of the sealing ring 25 tends to rotate it gradually so as to present new faces of engagement with the valve stem 12 and the counterbore 20, thus increasing the life of the device.

In fabricating the bushing 17, it is first made as illustrated in Fig. 3, in which a tubular extension 29 of the counterbore 20 is provided. The sealing ring 25 preferably is then inserted into the counterbore 20 in the position illustrated in Fig. 4, following which the tubular extension 29 is swaged or otherwise formed into the semi-cup-shaped closure element 22, as illustrated in Fig. 4. It is to be noted, however, that, if desired, the body member 18 may be fully formed with the closure element 22 thereon before the sealing ring 25 is inserted thereinto, the sealing ring being squeezed relatively flat and inserted thereinto through the opening 23. The closure element 22 thus retains the sealing ring 25 in place for shipment or handling, and in installation a tubular member need only be inserted through the opening 23, the inner diameter of the sealing ring, and the bore 19, as illustrated by the valve stem 12 in Fig. 5, to complete the assembly.

In Fig. 7 an alternative embodiment of the invention is illustrated in which the closure element 22 is provided with an extending tubular hub 30 adapted to act as a convenient stop or otherwise. The hub 30 is likewise preferably formed by a swaging operation.

Although I have shown and described a preferred embodiment of the invention, it will be understood that this is merely illustrative, and I desire to be afforded the full scope of the following claims.

I claim as my invention:

1. In an insert device, the combination of: a body member having a bore and a counterbore of larger diameter than said bore and axially aligned with said bore, there being a conical annular shoulder therebetween, said body member having an integral relatively thin-walled, tubular extension providing a substantially conical, annular flange extending axially and radially inward and forming a semi cup-shaped closure element partially closing said counterbore; and an annular sealing ring confined in said counterbore and adapted to roll therein between said conical shoulder and said conical closure element, said ring being formed of resilient material and being normally circular in cross section, said ring when assembled in said counterbore having an external diameter substantially equal to the diameter of said counterbore and an internal diameter substantially less than that of said bore, said counterbore being substantially longer than the axial dimension of said sealing ring.

2. An insert device adapted for insertion into a threaded opening of a valve body, comprising: a body member having external screw threads to adapt it to be screwed into the threaded opening, said body member having a bore at one end extending through a portion of its length and a counterbore at the other end extending through the remainder of its length, there being a first annular conical shoulder between said bore and said counterbore, said body member having a thin, annular extension at said other end, said extension projecting outwardly from said other end and radially inward toward the axis of said counterbore to provide a closure for said counterbore, the inner surface of said extension providing a second conical shoulder; and an annular sealing ring confined in said counterbore between said first and second shoulders, said ring being of resilient material and being normally circular in cross section, said ring when assembled in said counterbore having an external diameter substantially equal to the diameter of said counterbore and an internal diameter substantially less than that of said bore.

3. An insert device adapted for insertion into a threaded opening of a valve body, comprising: a body member having external screw threads to adapt it to be screwed into the threaded opening, said body member having a bore at one end extending through a portion of its length and a counterbore at the other end extending through the remainder of its length, there being a first annular conical shoulder between said bore and said counterbore, said body member having an integral, thin, annular, curved extension at said other end and bordering said counterbore, said extension curving outwardly from said other end and radially inward toward the axis of said counterbore to provide a closure for said counterbore, the inner surface of said extension providing a second conical shoulder; and an annular sealing ring confined in said counterbore between said first and second shoulders, said ring being of resilient material and being normally circular in cross section, said ring when assembled in said counterbore having an external diameter substantially equal to the diameter of said counterbore and an internal diameter substantially less than that of said bore.

JOHN N. GLADDEN.

REFERENCES CITED

The following references are of record in the file of this patent:

UNITED STATES PATENTS

| Number | Name | Date |
|---|---|---|
| 931,128 | Keith | Aug. 17, 1909 |
| 2,157,868 | Robertson | May 9, 1939 |
| 2,180,795 | Christensen | Nov. 21, 1939 |
| 2,360,731 | Smith | Oct. 17, 1944 |
| 2,420,104 | Smith | May 6, 1947 |

FOREIGN PATENTS

| Number | Country | Date |
|---|---|---|
| 7,679 | Sweden | 1897 |